United States Patent Office 3,582,360
Patented June 1, 1971

3,582,360
COCOA FLAVORING COMPOSITION CONTAINING 2-PHENYL - 2 - ALKENALS AND METHOD OF USING SAME
Michel van Praag, Matawan, N.J., and Herbert S. Stein, Rosedale, N.Y., assignors to International Flavors & Fragrances Inc., New York, N.Y.
No Drawing. Filed Apr. 26, 1968, Ser. No. 724,611
Int. Cl. A23l 1/22; C07c 47/48
U.S. Cl. 99—140
6 Claims

ABSTRACT OF THE DISCLOSURE

Novel unsaturated aldehydes, particularly 2-phenyl-2-alkenals, useful for preparing flavoring compositions and food compositions, particularly those having chocolate or cocoa flavor and/or aroma qualities; flavoring and food compositions containing such aldehydes; and methods for preparing such aldehydes and compositions.

BACKGROUND OF THE INVENTION

There is a need for materials which can impart a desired flavor and/or aroma to foodstuffs or which can be used to enhance or alter the naturally occurring flavors in foodstuffs. Chocolate- and cocoa-flavored foodstuffs are very popular, and a great deal of effort has gone into the preparation of materials which have a natural chocolate or cocoa flavor and into efforts to improve the chocolate and cocoa flavors of certain types of natural materials.

In the past, it was found that substitute chocolate and cocoa flavoring materials lacked certain flavor and aroma characteristics found in quality chocolate and cocoa, and the products made from such materials were deficient in such characteristics.

THE INVENTION

The invention comprises the novel compositions and component mixtures comprised in such compositions, as well as the novel processes and steps of processes according to which such compositions may be manufactured, specific embodiments of which are described hereinafter by way of example only and in accordance with what is now considered to be the preferred manner of practicing the invention.

Briefly, this invention provides 2-phenyl-2-alkenals capable of imparting chocolate and/or cocoa flavor and/or aroma or of enhancing such flavor and aroma. The present invention also provides flavoring compositions and food compositions containing small quantities of such 2-phenyl-2-alkenals effective to impart a chocolate and/or cocoa flavor and/or fragrance quality to, or enhance such quality in, such compositions.

Many chocolate and cocoa foods and flavoring materials lack a certain flavor and aroma note, and this lack substantially detracts from their overall organoleptic impression. It has been found that this missing flavor note is one which can be characterized as green pungent cocoa-like. This green pungent cocoa-like flavor and aroma note is supplied to chocolate, cocoa and other flavors according to the present invention by the addition of unsaturated aldehydes, more specifically 2-phenyl-2-alkenals having the structure

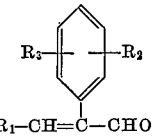

$R_1-CH=C-CHO$

These unsaturated aldehydes can be cis, trans, or mixtures of the two isomers, and the foregoing formula is intended to represent such isomers. It will be understood that in general the alkenal is alkyl-substituted and the phenyl group substituent on the $\alpha$-carbon atom can be unsubstituted or mono- or dialkyl-substituted, so that $R_1$ in the foregoing formula is an alkyl group containing from 1 to about 4 carbon atoms, and $R_2$ and $R_3$ are hydrogen or lower alkyl having from one to about three carbon atoms.

The particular interesting green pungent cocoa-like flavor is present in a greater degree as the number of carbon atoms in the propenal chain increases. It will be understood from this description that the alkyl groups can comprise primary and secondary carbon atoms. Thus, $R_1$ can for example be methyl, ethyl, isopropyl, isobutyl, or secondary butyl.

Substitution of the phenyl ring has the effect of varying the flavor character of the propenals of this invention. Generally as the chain length of one of the alkyl groups on the phenyl ring increases, the others should be shorter. Some of the more preferred alkenals according to this invention are monoalkyl-substituted on the phenyl ring. It will be understood that the alkyl group substituent on the phenyl ring can be straight- or branched-chain. Thus, $R_2$ and $R_3$ can be methyl, ethyl, or isopropyl and can be the same or different. In certain aspects of this invention, it is greatly preferred that $R_2$ and $R_3$ both be methyl or that $R_2$ be methyl, ethyl, or isopropyl and $R_3$ be hydrogen.

In many instances the optimum balance of flavor and/or aroma is obtained by utilizing a mixture of the 2-phenyl-2-alkenals. When mixtures of aldehydes are used, their proportions can be varied to suit the particular composition which is to be flavored, enhanced, or otherwise altered and will depend upon whether the invention is being utilized to enhance the flavor of a chocolate, cocoa, or other foodstuff which already has some desirable flavor and aroma characteristics or whether the entire flavor and/or aroma are to be supplied by the addition of a flavoring composition. For example, it has been found when preparing cocoa flavors that a good blend is obtained by using a mixture of about 80–90% of 5-methyl-2-phenyl-2-hexenal, about 3–7% of 4-methyl-2-phenyl-2-pentenal and from about 3–7% of 2-phenyl-2-butenal. It will be understood that these ratios can be varied as necessary to enhance or fortify the flavor of the foodstuff. All parts, proportions, percentages and ratios herein are by weight, unless otherwise indicated.

It will be appreciated from the foregoing that the aldehydes according to this invention can be mixed with other flavoring ingredients, carriers, and vehicles to form compositions suitable for imparting a flavor to, enhancing the flavor in, or altering the flavor of, a comestible. Such compositions are herein called "flavoring compositions." The aldehydes according to this invention can also be added directly to a food composition to alter, enhance, modify or impart flavor to the food composition. In the latter instance it is only necessary to add the aldehyde or aldehydes and to make certain that they are thoroughly and uniformly distributed through the food.

When the aldehydes of this invention are used in flavoring compositions to enhance existing flavors in, or to provide the entire flavor impression to, a foodstuff, the aldehydes can be combined with organic acids including fatty, saturated, unsaturated and amino acids, alcohols including primary and secondary alcohols, esters, carbonyl compounds including aldehydes and ketones, lactones, cyclic organic materials including benzene derivatives, alicyclics, heterocyclics such as furans, pyridines, pyrazines and the like, sulfur-containing materials including thiols, sulfides, disulfides and the like, proteins, lipids, carbohydrates, and so-called flavor potentiators such as monosodium glutamate, guanylates, inosinates, natural flavoring materials such as cocoa, vanilla, artificial flavoring materials such as vanillin, and the like. It will be appreciated that the types and amounts of materials selected from the foregoing groups of materials will depend upon the precise organoleptic character desired in the finished product and, especially in the case of flavoring compositions used to enhance other flavors, will vary according to the foodstuff to which flavor and aroma are to be imparted. Inorganic materials such as sodium chloride and freshness preservers such as butylated hydroxyanisole and propyl gallate can be added for their adjuvant or preservative effects on the flavoring composition.

As noted above, it can also be desirable to utilize carriers such as gum arabic and carrageenen or vehicles such as ethyl alcohol, water, propylene glycol. When the carrier is an emulsion, the flavoring composition can also contain emulsifiers such as mono- and diglycerides of fatty acids and the like. With these carriers or vehicles the desired physical form of the composition can be prepared. It will be understood that the aldehydes of this invention can be used in spray-dried, liquid, encapsulated, emulsified and other forms in which flavorings are added to foodstuffs. The aldehydes can be so used alone or in combination with the other ingredients set forth herein. In the case of a foodstuff which is prepared from a combination of ingredients the aldehydes, flavor enhancers and flavoring compositions of this invention can be added to one of the ingredients and thereby be incorporated into the composition as a whole.

The amount of 2-phenyl-2-alkenal or -alkenals used should be sufficient to impart a green pungent cocoa flavor and aroma note to the ultimate foodstuff in which the aldehydes are used. Thus, a small but effective amount of aldehyde sufficient to provide a green pungent cocoa flavor note to round out the cocoa, chocolate, or other flavor note in the ultimate foodstuff is used. The amount used will vary depending upon the ultimate food composition to be flavored; for example, more may be required in providing a full, rounded chocolate flavor to an unflavored material and less may be required when this invention is used to enhance a chocolate or cocoa foodstuff or flavoring material which is deficient in natural flavor or aroma.

Those skilled in the art will appreciate that the amount of aldehyde according to this invention can be varied over a range to provide the desired flavor and aroma. The use of too little of the aldehyde or aldehydes will not give the full benefit, while too much aldehyde will make the flavor compositions and foodstuffs needlessly costly, and in extreme cases will unbalance the flavor and aroma so that optimum results are not obtained.

It is accordingly preferred that the ultimate food composition contain at least about 10 parts per million (p.p.m.) of the aldehydes, based on total composition, and it is not generally desirable to use more than about 500 p.p.m. in the finished composition. Accordingly, the desirable range for use in the practice of this invention is from about 10 to about 550 p.p.m. of the 2-phenyl-2-alkenal compound or compounds. When these aldehydes are added to the foodstuff in the form of chocolate, cocoa, or other flavor composition, the amount should be sufficient to impart the requisite flavor and/or aroma note to the composition so that the flavor and aroma will be balanced in the finished foodstuff. Accordingly, the flavoring compositions of this invention preferably contain from about .02% to about 10% of 2-phenyl-2-alkenal based on the total weight of said flavoring composition.

The aldehydes according to this invention are added to the foodstuff either alone or as flavor compositions formed by admixture of such aldehydes with conventional chocolate, cocoa, or other "heavy" flavor and aroma ingredients such as amyl phenyl acetate, vanillin, n-butyl phenylethyl acetal, and diacetyl. These can be combined in proportions normally used in the art for preparation of the flavor. For example, the following composition can be prepared:

| Ingredient: | Amount (oz. av.) |
| --- | --- |
| Amylphenyl acetate | 4.000 |
| Vanillin | 4.000 |
| Aldehyde C–18 | 0.125 |
| Veratraldehyde | 0.125 |
| n-Butylphenyl ethylacetal | 0.500 |
| Propylene glycol | 48.250 |
| Diacetyl | 0.500 |
| 5-methyl-2-phenyl-2-hexenal | 0.500 |

When the aldehydes according to this invention are used in the formulation of chocolate flavoring material, it has been found especially useful to combine them with a vanilla flavoring agent and an alkyl acetate. Thus, the aldehydes can be combined with vanilla extract or other vanilla flavoring agent such as vanillin and with amyl phenyl acetate. Compositions containing an aldehyde or aldehydes accordng to this invention with vanillin and the amyl phenyl acetate provide a flavor enhancer which imparts a more natural cocoa flavor and aroma to imitation cocoa flavor compositions.

The flavoring compositions of this invention can be added to the foodstuffs by conventional methods known in the art. For example, in the preparation of a chocolate frosting mix, the flavoring compositions can be incorporated with the fat, sugar, thickeners, freshness preservers and the like, and admixed in a conventional blender to obtain the desired consistency. Alternatively, the flavor material of this invention, together with any other liquids if desired, can be admixed with a carrier, such as gum arabic, gum tragacanth, carrageenen and the like, and spray-dried to obtain a particulate solid flavoring material.

Where a powdered prepared cocoa mix is being made, the dried milk solids, sugar and flavoring compositions or unsaturated aldehydes of this invention are mixed together in a dry blender to attain uniformity. In the case of such prepared dry mixes, the aldehydes or flavor compositions of the present invention can be distributed on one or more of the solid ingredients or any portion thereof, for example the dried milk solids, and subsequently blended with the other ingredients.

When liquid materials are involved in the preparation of foodstuffs, for example, cake batters and chocolate milk, the flavoring materials of this invention can be combined with either the liquid to be used in the finished composition, or alternatively they can be added with a liquid carrier in which they are dissolved, emulsified, or otherwise dispersed.

In adding the aldehydes of this invention to a foodstuff or flavor composition, it will be understood that the aldehyde or aldehydes can be added in the form of precursors which will release the free aldehydic material upon hydrolysis, heating, or other treatment to which the foodstuff or a component thereof is subjected. Thus, when hydrolytic conditions will obtain prior to use, the aldehyde or aldehydes can be added in the form of the corresponding acetals such as the lower dialkyl acetal or hemiacetal, a bisulfite addition compound, and the like. Such modes of addition are contemplated within the purview of this invention and are regarded as equivalent to adding the aldehyde or aldehydes per se.

The novel materials of this invention can be prepared by reaction of two aldehydes in the presence of a basic catalyst via the aldol condensation reaction:

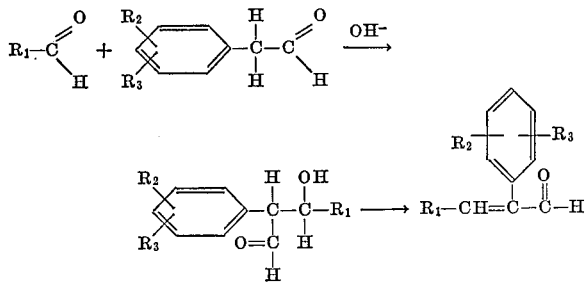

wherein $R_1$, $R_2$ and $R_3$ are as defined above.

In carrying out the foregoing reaction phenylacetaldehyde or a substituted phenyl acetaldehyde, e.g., isopropyl phenyl acetaldehyde, is reacted with a lower alkyl aldehyde having two or more carbon atoms in the molecule. Thus, the aromatic acetaldehyde can be reacted with acetaldehyde, propionaldehyde, butyraldehyde, and branched lower alkyl aldehydes such as isovaleraldehyde and the like. It is preferred to use substantially equimolar proportions of the aldehydes, since in many instances a substantial excess of either aldehyde will unnecessarily consume the reactants in the production of undesired by-products.

The reaction is preferably carried out in the presence of a vehicle inert to the reactants under the reaction conditions. Examples of inert solvents which can be used in practicing the invention are ethyl alcohol, propanol, and the like. Such inert vehicles permit more accurate control of the temperature and rate of the reaction and diminish the quantity of undesired by-products.

The reaction to produce the aldehydes of this invention is preferably carried out in the presence of a basic catalyst. The catalyst should preferably be soluble in the reaction medium formed by the inert vehicle, if any, and the reactant aldehydes. Convenient basic catalysts are the alkali metal and alkaline earth metal hydroxides such as sodium hydroxide, potassium hydroxide, lithium hydroxide, barium hydroxide, calcium hydroxide and magnesium hydroxide, and the salts of strong bases and weaker acids such as sodium propionate, sodium acetate, potassium acetate, and the like. The alkali metal acetates and hydroxides are generally preferred in carrying out the process to produce the alkenals of this invention. It will be appreciated by those skilled in the art that an excess of strong base can produce undesirable by-products.

The temperature at which the reaction is carried out can vary over a wide range depending upon the particular reactant aldehydes, the basic catalyst, and the vehicle. Generally, low temperatures involve long reaction times, whereas very high temperatures require high-pressure vessels and may produce undesired by-products. It is accordingly preferred to carry out the process at temperatures in the range of from about 60° to about 150° C. and it is most convenient to carry out the reaction at the reflux temperature of the reaction mixture.

It will be appreciated by those skilled in the art that the reaction can be carried at sub- or super-atmospheric pressures depending upon the reactants, solvents, catalysts, and reaction times. It is generally preferred to carry out the reaction under atmospheric pressure, and the inert vehicle can be chosen to provide the desired reaction rate at its reflux temperature.

The time of the reaction can be varied over a wide range of from one to thirty hours depending upon the reactants, the completeness desired, and the tendency toward production of undesired by-products.

After the reaction is completed to the desired extent, the product can be isolated from the reaction mixture by convenient means such as extraction, distillation, and the like. The product is washed or treated with acid to remove the basic catalyst and can then be washed with an inert solution such as sodium chloride and dried to remove any traces of water remaining in the organic phase. The product can be separated from the dried mixture by convenient methods such as distillation, extraction and the like. Since minor amounts of undesired aldol condensates can be formed in addition to the desired aldehydes, the reaction product is preferably purified by fractional distillation. When the 2-phenyl-2-alkenal or -alkenals so produced is or are to be used in preparing flavor compositions or food compositions as described herein, there should be no impurities present which would contribute a foreign flavor or off-flavor or aroma.

The following examples are given to illustrate embodiments of the invention as it is now preferred to practice it. It will be understood that these examples are illustrative, and the invention is not to be considered as restricted thereto except as indicated in the appended claims.

EXAMPLE I

Preparation of 5-methyl-2-phenyl-2-hexenal

Into a five-liter Morton flask, equipped with stirrer, thermometer, heating mantle, reflux condenser and addition tube the following ingredients are introduced:

| | G. |
|---|---|
| Anhydrous sodium acetate (2.3 moles) | 186 |
| Water | 370 |
| Anhydrous ethyl alcohol | 370 |

The solution is maintained at 25° C. and stirred until the sodium acetate completely dissolves. The following ingredients are added through a dropping funnel during a 15-minute period:

| | G. |
|---|---|
| Phenylacetaldehyde (3.7 moles) | 440 |
| Isovaleraldehyde (3.7 moles) | 318 |

The solution is heated to reflux and maintained there for about three hours. The reaction progress is monitored using a gas-liquid chromatographic (GLC) technique. (Conditions: Column T=200° C.; Flow rate, 100 ml./min.; ¼" x 8" column packed with Chromosorb W 60/80 mesh, a diatomaceous earth sold by Johns Manville Company coated with Silicone SE-30 gum rubber silicone.)

When the reaction is completed, the reaction mass exists in two phases: an aqueous phase and an organic non-aqueous phase. The aqueous phase is separated from the organic phase, and the aqueous phase is washed with two 500 ml. volumes of diethyl ether. The ether washings are combined with the organic phase, and the organic phase is then washed in ice water until the final washing has a pH of 7. The organic phase is then washed with a saturated NaCl solution and dried over anhydrous magnesium sulfate. The dried organic phase is fractionally distilled at a 1:1 reflux ratio.

The desired 5-methyl-2-phenyl-2-hexenal distills at 96–100° C. at about 0.7 mm. Hg pressure in a yield of 115.4 g.

IR (infrared) analysis of the desired product yields the following data:

| Wave number (cm.$^{-1}$): | Interpretation |
|---|---|
| 2700, 2800, 1630, 1675 | Conjugated aldehyde. |
| 700, 725 | Monosubstituted benzene. |

NMR (nuclear magnetic resonance) analysis yields the following data:

| P.p.m. (τ) | Interpretation |
|---|---|
| 9.12 (d, J=6.0 Hz, 6H) | $C\underline{H}_3-\overset{H}{\underset{|}{C}}-C\underline{H}_3$ |
| 7.80 (t, 2H) | $=CH-C\underline{H}_2-\overset{}{\underset{CH_3}{CH}}-CH_3$ |
| 8.3 (m, 1H) | $CH_2-\overset{CH_3}{\underset{CH_3}{C\underline{H}}}$ |
| 3.41 (t, J=7.2 Hz, 1H) | $=C\underline{H}-CH_2$ |
| 2.80 (m, 5H) | $-C-Ar$ |
| 0.43 (s, 1H) | $-\overset{O}{\overset{\|}{C}}-\underline{H}$ |

In the NMR data herein, *s* indicates a singlet; *d*, a doublet; *t* a triplet; *q* a quartet; and *m*, a multiplet. J is the "coupling constant" or frequency between two peaks in Hz. The number ahead of H indicates the number of protons accounted for.

Mass spectral analysis shows the following peaks in order of decreasing intensity: 117, 188 (M+), 115, 104, 91. Peaks below m/e 43 are not included.

EXAMPLE II

Preparation of 4-methyl-2-phenyl-2-pentenal

Into a three-liter Morton three-neck flask, equipped with stirrer, thermometer, heating mantle, reflux condenser and addition tube the following ingredients are introduced.

|  | G. |
|---|---|
| Anhydrous sodium acetate (2.3 moles) | 186 |
| Ehyl alcohol (50%) | 740 |
| Phenylacetaldehyde (3.7 moles) | 440 |
| Isobutyraldehyde (4.2 moles) | 305 |

The solution is heated to reflux and maintained above for a period of about four hours. The reaction progress is monitored using a GLC technique. (Conditions: Column T=200° C.; flow rate, 100 ml./min.; ¼" x 8' column packed with Chromosorb W 60/80 mesh coated with Silicone SE–30).

When the reaction is completed, the reaction mass exists in two phases: an aqueous phase and an organic phase. The aqueous phase is separated from the organic phase, and the aqueous phase is washed with two 220 ml. volumes of diethyl ether. The ether washings are combined with the organic phase, and the organic phase is then washed successively with 500 ml. 20% HCl, 500 ml. saturated NaHCO₃ and 500 ml. saturated NaCl solution. The layer is then dried over anhydrous sodium sulfate. The dried organic layer is fractionally distilled at a 4:1 reflux ratio.

The desired 4-methyl-2-phenyl-2-pentenal distills at 82–87° C. at about 0.7 mm. Hg pressure in a yield of 174.1 g.

IR analysis of the desired product yields the following data:

Wave number (cm.⁻¹): Interpretation
2700, 2800, 1630, 1675 – Conjugated aldehyde.
708, 725 – Monosubstituted benzene.

NMR analysis yields the following data:

| P.p.m. Tau | |
|---|---|
| 0.27 (s, 1H) | $-\overset{O}{\overset{\|}{C}}\underline{H}$ |
| 2.78 (m, 5H) | Aryl protons. |
| 3.62 (d, J=10 Hz, 1H) | $-\overset{O}{\overset{\|}{C}}-\overset{Ar}{\overset{\|}{C}}=C\underline{H}-C$ |
| 7.30 (m, 1H) | $-\overset{O}{\overset{\|}{C}}-\overset{Ar}{\overset{\|}{C}}=CH-C\underline{H}(CH_3)_2$ |
| 8.95 (d, J=6.6 Hz, 6H) | $-CH-C\underline{H}_3 \atop \overset{|}{C}\underline{H}_3$ |

Mass spectral analysis shows the following peaks in order of decreasing intensity: 174 (M+), 103, 131, 91, 159.

EXAMPLE III

Preparation of 2-phenyl-2-butenal

Into a two-liter Morton three-neck flask, equipped with stirrer, thermometer, heating mantle, and reflux condenser the following ingredients are introduced:

|  | G. |
|---|---|
| Anhydrous sodium acetate (2.3 moles) | 186 |
| Water | 370 |
| Anhydrous ethyl alcohol | 370 |
| Phenylacetaldehyde (3.7 moles) | 440 |
| Acetaldehyde (4.23 moles) | 186 |

The solution is heated to reflux and maintained there for a period of about 24 hours. The reaction process is monitored using a GLC technique. (Conditions: Column T=200° C.; flow rate, 100 ml./mm.; ¼" x 8' column packed with Chromosorb W 60/80 mesh coated with Silicone SE–30.)

When the reaction is completed, the reaction mass exists in two phases: an aqueous phase and an organic non-aqueous phase. The aqueous phase is separated from the organic phase, and the aqueous phase is washed with two 100 ml. volumes of diethyl ether. The ether washings are combined with the organic phase and the organic phase is then dried over anhydrous magnesium sulfate. The dried organic phase is fractionally distilled at a 9:1 ratio.

The desired 2-phenyl-2-butenal distills at 95–100° C. at about 1.5–2.5 mm. Hg pressure.

IR analysis of the desired product yields the following data:

Wave number (cm.⁻¹): Interpretation
2700, 2800, 1630, 1680 – Conjugated aldehyde.
700, 730 – Monosubstituted benzene.

NMR analysis yields the following data:

| P.p.m. (τ) | Interpretation |
|---|---|
| 8.12 (d, J=7.2 Hz, 3H) | $C\underline{H}_3-CH=$ |
| 3.55 (q, 1H) | $CH_3-C\underline{H}$ |
| 2.77 (m, 5H) | Aryl protons. |
| 0.50 (s, 1H) | $-\overset{O}{\overset{\|}{C}}\underline{H}$ |

Mass spectral analysis shows the following peaks in order of decreasing intensity: 117, 146(M+), 115, 91, 116.

EXAMPLE IV

Preparation of 4-methyl-2-phenyl-2-hexenal

Into a five-liter Morton flask, equipped with stirrer, thermometer, heating mantle, reflux condenser and addition tube the following ingredients are introduced:

| | G. |
|---|---|
| Anhydrous sodium acetate (2.3 moles) | 186 |
| Water | 370 |
| Anhydrous ethyl alcohol | 370 |

The solution is maintained at 25° C. and stirred until the sodium acetate completely dissolves. A mixture of the following ingredients is added through a dropping funnel during a 15-minute period:

| | G. |
|---|---|
| Phenylacetaldehyde (3.7 moles) | 440 |
| 2-methylbutyraldehyde (4.2 moles) | 365 |

The addition of this mixture causes the temperature of the reaction mass to rise to 35° C.

The solution is heated to reflux and maintained there for a period of about nine hours. The reaction progress is monitored using gas-liquid chromatography (GLC) technique. (Conditions: Column T=200° C.; flow rate, 100 ml./min.; ¼" x 8' column packed with Chromosorb W 60/80 mesh coated with Silicone SE-30.). Ten g. of $Na_2CO_3$ is then added, and the reaction mass is stirred for a period of two hours. Five g. of KOH is added, and the reaction mass is stirred at reflux for a period of 12 hours at which time GLC indicates substantial diminution of the phenyl acetaldehyde reactant.

When the reaction is completed, the reaction mass exists in two phases: an aqueous phase and an organic phase. The aqueous phase is separated from the organic phase, and the aqueous phase is washed with two 150 ml. volumes of diethyl ether. The ether washings are combined with the organic phase and the organic phase is then washed successively with 500 ml. 15% HCl solution; 500 ml. saturated NaCl; 500 ml. 5% sodium bicarbonate; and two 500 ml. portions of saturated NaCl solution. The washed organic phase is dried over anhydrous magnesium sulfate and fractionally distilled at a 5:1 reflux ratio.

The desired 4-methyl-2-phenyl-2-hexenal distills at 88–98° C. at about 0.8–1.0 mm. Hg pressure.

IR analysis of the desired product yields the following data:

| Wave number (cm.$^{-1}$): | Interpretation |
|---|---|
| 2720, 2900, 1630, 1765 | Conjugated aldehyde. |
| 700, 725 | Monosubstituted benzene. |
| 1370 | Methyl. |

NMR analysis yields the following data:

| P.p.m.(τ) | Interpretation |
|---|---|
| 2.80 (m, 5H) | Aryl protons. |
| 3.63 (d, J=11 Hz, 1H) | 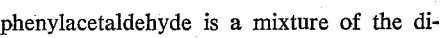 |
| 0.42 (s, 1H) | H—C(=O) |
| 7.6 (m, 1H) | H—C(CH₃)—C=C—C=O, CH₂—CH₃ |
| 8.6 (m, 2H) | —CH₂—CH₃ |
| 8.98 (d, J=6.9 Hz, 3H) | =C—C(H)—CH₃ |
| 9.20 (t, J=6.3 Hz, 3H) | CH₃—CH₂ |

Mass spectral analysis shows the following peaks, in order of decreasing intensity: 91, 188 (M+), 103, 131, 159.

EXAMPLE V

Preparation of 5-methyl-2-(dimethylphenyl)-2-hexenal

Into a 25 ml. round-bottom flask equipped with a reflux condenser are added the following ingredients:

| | G. |
|---|---|
| Distilled water | 0.50 |
| Ethyl alcohol (95%) | 1.10 |
| Sodium acetate trihydrate | 0.80 |

The contents of the flask are warmed slightly until the sodium acetate dissolves. The following mixture of ingredients is then added:

| | G. |
|---|---|
| Dimethylphenylacetaldehyde (0.01 mole) | 1.48 |
| Isovaleraldehyde (0.01 mole) | 0.86 |

The dimethylphenylacetaldehyde is a mixture of the dimethylphenyl isomers.

The flask is heated in a boiling water bath and stirred magnetically. A 20 mg. portion of potassium hydroxide pellets is added and the mixture is refluxed for three hours. The reaction is monitored by GLC. (Conditions: F&M 700 Carbowax 20-M packed column, 8' x ¼" O.D., flow rate 100 ml./min., temperature programmed 100–225° C., 4° C./min.)

After the reaction is judged to be completed, the organic layer is separated from the aqueous layer and dried over anhydrous sodium sulfate. The products are then purified by preparative gas chromatography.

The products isolated and identified are 5-methyl-2-(2,6-dimethylphenyl)-2-hexenal and 5-methyl-2-(2,4-dimethylphenyl)-2-hexenal containing some 5-methyl-2-(3,5-dimethylphenyl)-2-hexenal. Each of these products can be used to contribute to a desired cocoa flavor.

EXAMPLE VI

Preparation of 5-methyl-2-(isopropylphenyl)-2-hexenal

An aldol condensation of isopropylphenylacetaldehyde (homocuminic aldehyde) with isovaleraldehyde is conducted according to the procedure given above. GLC analysis shows the production of 5-methyl-2-(2-isopropylphenyl)-2-hexenal, 5-methyl-2-(3-isopropylphenyl)-2-hexenal, and 5-methyl-2-(4-isopropylphenyl)-2-hexenal.

Evaluation of a mixture containing 43% of the 2-isopropylphenyl isomer, 46% of the 3-isopropylphenyl isomer, and 11% of the 4-isopropylphenyl isomer shows a cocoa-like odor and a slightly bitter taste. Similar evaluation of a mixture of 9% 2-, 45% 3- and 46% 4-isopropylphenyl compounds and 95% pure 4-isopropylphenyl shows, respectively, a cocoa-like odor and a heavy cocoa-like taste and a cocoa odor and cocoa taste nuance.

5-methyl-2-(4-methylphenyl)-2-hexenal is similarly prepared by base-catalyzed aldol condensation of p-methylphenylacetaldehyde with isovaleraldehyde. This material has a cocoa-like flavor note suitable for the preparation of cocoa and chocolate flavors.

EXAMPLE VII

The following base cocoa flavor material is prepared by admixing the following ingredients:

| Ingredient: | Parts by weight |
|---|---|
| Vanillin | 60.0 |
| Amylphenyl acetate | 45.0 |
| Benzyl butyrate | 2.5 |
| Veratraldehyde | 2.5 |
| Maltol | 1.0 |
| Propylene glycol | 530.0 |

To 1 g. of this base cocoa flavor, 50 mg. of 5-methyl-2-phenyl-2-hexenal is added. This hexenal addition alters the imitation cocoa flavor to provide a more natural cocoa flavor and impart a character of bitter chocolate.

EXAMPLE VIII

To 1 g. of the base cocoa flavor described in Example VII, 50 mg. of a mixture of 2-phenyl-2-alkenals is added. The composition of the mixture is:

| Ingredient: | Parts by weight |
|---|---|
| 2-phenyl-2-butenal | 4.0 |
| 4-methyl-2-phenyl-2-pentenal | 1.5 |
| 5-methyl-2-phenyl-2-hexenal | 38.0 |

This aldehyde mixture alters the imitation flavor to provide an excellent flavor with a strong chocolate character.

EXAMPLE IX

The aldehyde mixture described in Example VII is added to a commercially available soluble powdered cocoa beverage to provide 100 p.p.m. of the added aldehydes. The flavor is enhanced to provide a high quality chocolate drink.

EXAMPLE X

To 100 ml. of sweetened milk, 100 mg. of the base cocoa flavor material described in Example VII is added. The same is divided into two equal portions. To one portion 2 mg. of 5-methyl-2-phenyl-2-hexenal is added. The portion with added hexenal has a good flavor resembling genuine chocolate milk more closely than the portion to which no hexenal is added.

What is claimed is:

1. The process of altering the flavor of a food composition which comprises adding to a food a small but effective amount of an essentially pure form of at least one 2-phenyl-2-alkenal having the formula

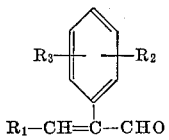

wherein $R_1$ is an alkyl group having from two to about four carbon atoms, and $R_2$ and $R_3$ are hydrogen or lower alkyl groups having from one to about three carbon atoms and are the same or different, said alkenal being apart from the natural constituent of cocoa bean, to impart a green pungent cocoa-like flavor to the composition.

2. A process according to claim 1 wherein the alkenal is 4-methyl-2-phenyl-2-pentenal, 4-methyl-2-phenyl-2-hexenal, 5 - methyl - 2 - phenyl-2-hexenal, 5-methyl-2-(2,6-dimethylphenyl) - 2 - hexenal, 5-methyl-2-(2,4-dimethylphenyl)-2-hexenal, 5 - methyl-2-(3,5-dimethylphenyl)-2-hexenal, 5 - methyl-2-(4-methylphenyl)-2-hexenal, 5-methyl-2-(isopropylphenyl)-2-hexenal, or mixtures thereof.

3. A flavoring composition comprising: (1) an essentially pure form of a 2-phenyl-2-alkenal having the formula

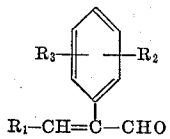

wherein $R_1$ is an alkyl group having from two to about four carbon atoms, and $R_2$ and $R_3$ are hydrogen or lower alkyl groups having from one to about three carbon atoms and are the same or different, said alkenal being apart from the natural constituents of cocoa beans, and (2) other flavoring ingredients, carrier, vehicle, or mixtures thereof.

4. A flavoring composition according to claim 3 wherein the alkenal is 4-methyl-2-phenyl-2-pentenal, 4-methyl-2-phenyl-2-hexenal, 5-methyl-2-phenyl-2-hexenal, 5-methyl-2-(2,6-dimethylphenyl)-2-hexenal, 5 - methyl-2-(2,4-dimethylphenyl) - 2 - hexenal, 5-methyl-2-(3,5-dimethylphenyl)-2-hexenal, 5 - methyl-2-(4-methylphenyl)-2-hexenal, 5 - methyl - 2 - (isopropylphenyl) - 2-hexenal, or mixtures thereof.

5. A food composition which comprises a food and an amount of an essentially pure form of at least one 2-phenyl-2-alkenal having the formula

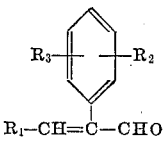

wherein $R_1$ is an alkyl group having from one to about four carbon atoms, and $R_2$ and $R_3$ are hydrogen or lower alkyl groups having from one to about three carbon atoms and are the same or different, said alkenal being apart from the natural constituents of cocoa beans, sufficient to impart a green pungent cocoa-like flavor quality to the composition.

6. A food composition according to claim 5 wherein the alkenal is 4-methyl-2-phenyl-2-pentenal, 4-methyl-2-phenyl - 2 - hexenal, 5-methyl-2-phenyl-2-hexenal, 5-methyl-2-(2,6-dimethylphenyl)-2-hexenal, 5-methyl-2-(2,4-dimethylphenyl)-2-hexenal, 5-methyl-2-(3,5-dimethylphenyl)-2-hexenal, 5-methyl-2-(4-methylphenyl)-2-hexenal, 5-methyl-2-(isopropylphenyl)-2-hexenal, or mixtures thereof.

References Cited

UNITED STATES PATENTS

| | | | |
|---|---|---|---|
| 2,102,965 | 12/1937 | Meuly | 260—599X |
| 2,435,018 | 1/1948 | Ruzika | 260—599X |
| 2,745,746 | 5/1956 | Jones | 99—23 |
| 3,385,710 | 5/1968 | Reymond et al. | 99—26 |

OTHER REFERENCES

Van Praag, et al., "Steam Volatile Aroma Constituents of Roasted Cocoa Beans," J. Agr. & Food Chem., vol. 16, No. 6, November–December (1968), pp. 1005–1008.

JOSEPH SCOVRONEK, Primary Examiner

W. BOVEE, Assistant Examiner

260—599